United States Patent
Gupta et al.

(10) Patent No.: US 10,210,404 B2
(45) Date of Patent: *Feb. 19, 2019

(54) VEHICLE VISION SYSTEM WITH VEHICLE DETECTION

(71) Applicant: MAGNA ELECTRONICS INC., Auburn Hills, MI (US)

(72) Inventors: Nikhil Gupta, Brampton (CA); Liang Zhang, Ottawa (CA)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/899,116

(22) Filed: Feb. 19, 2018

(65) Prior Publication Data

US 2018/0173972 A1 Jun. 21, 2018

Related U.S. Application Data (63) Continuation of application No. 15/150,843, filed on May 10, 2016, now Pat. No. 9,898,671.

(60) Provisional application No. 62/159,515, filed on May 11, 2015.

(51) Int. Cl.
*G06K 9/00* (2006.01)
*B60R 1/00* (2006.01)
*G06T 7/246* (2017.01)
*B60R 11/04* (2006.01)

(52) U.S. Cl.
CPC ............ *G06K 9/00805* (2013.01); *B60R 1/00* (2013.01); *G06T 7/246* (2017.01); *B60R 11/04* (2013.01); *B60R 2300/105* (2013.01); *B60R 2300/307* (2013.01); *B60R 2300/8093* (2013.01); *G06T 2207/30261* (2013.01)

(58) Field of Classification Search
CPC .................. G06K 9/00805; B60R 1/00; G06T 2207/30261
USPC ......................................................... 348/148
See application file for complete search history.

(56) References Cited

U.S. PATENT DOCUMENTS

| | | | |
|---|---|---|---|
| 5,550,677 A | 8/1996 | Schofield et al. |
| 5,670,935 A | 9/1997 | Schofield et al. |
| 5,949,331 A | 9/1999 | Schofield et al. |
| 7,038,577 B2 | 5/2006 | Pawlicki et al. |
| 7,720,580 B2 | 5/2010 | Higgins-Luthman |
| 7,855,755 B2 | 12/2010 | Weller et al. |
| 9,205,776 B2 | 12/2015 | Turk |
| 9,357,208 B2 | 5/2016 | Gupta et al. |
| 9,547,795 B2 | 1/2017 | Gupta |

(Continued)

*Primary Examiner* — Nguyen T Truong
(74) *Attorney, Agent, or Firm* — Honigman LLP (57) ABSTRACT

A method for detecting a vehicle via a vehicular vision system includes equipping a vehicle with a camera and providing a control at the equipped vehicle. Frames of image data captured by the camera are processed, via an image processor of the control. Responsive at least in part to (i) vehicle motion information of the equipped vehicle and (ii) processing, via the image processor, of frames of image data captured by the camera, detecting a vehicle present in the field of view of the camera and determining motion of the detected vehicle relative to the moving equipped vehicle, wherein determining motion of the detected vehicle relative to the moving equipped vehicle includes (i) determining corresponding feature points of the detected vehicle in at least two frames of captured image data and (ii) estimating vehicle motion trajectory of the detected vehicle based on the determined corresponding feature points.

25 Claims, 4 Drawing Sheets

(56) References Cited

U.S. PATENT DOCUMENTS

| | | |
|---|---|---|
| 9,898,671 B2 | 2/2018 | Gupta et al. |
| 2007/0154068 A1 | 7/2007 | Stein |
| 2012/0069185 A1 | 3/2012 | Stein |
| 2012/0200707 A1 | 8/2012 | Stein et al. |
| 2014/0160244 A1 | 6/2014 | Berberian et al. |
| 2014/0161323 A1 | 6/2014 | Livyatan et al. |
| 2014/0247352 A1 | 9/2014 | Rathi et al. |
| 2014/0347486 A1 | 11/2014 | Okouneva |
| 2015/0002670 A1 | 1/2015 | Bajpai |
| 2015/0049193 A1 | 2/2015 | Gupta et al. |
| 2015/0151742 A1 | 6/2015 | Clarke et al. |
| 2015/0151751 A1 | 6/2015 | Clarke et al. |
| 2015/0151753 A1 | 6/2015 | Clarke et al. |
| 2015/0153735 A1 | 6/2015 | Clarke et al. |
| 2015/0175072 A1 | 6/2015 | Sabeti |
| 2015/0178576 A1 | 6/2015 | Gupta |
| 2015/0179074 A1 | 6/2015 | Gupta |
| 2015/0291215 A1 | 10/2015 | Bajpai et al. |
| 2015/0298621 A1 | 10/2015 | Katoh |
| 2016/0180158 A1 | 6/2016 | Gupta et al. |
| 2016/0180180 A1 | 6/2016 | Gupta et al. |
| 2016/0180182 A1 | 6/2016 | Gupta et al. |
| 2016/0325682 A1 | 11/2016 | Gupta et al. |
| 2017/0154241 A1 | 6/2017 | Shambik |
| 2017/0177953 A1 | 6/2017 | Stein et al. |
| 2017/0287108 A9 | 10/2017 | Livyatan et al. |
| 2017/0336793 A1 | 11/2017 | Shashua et al. |
| 2017/0371344 A1 | 12/2017 | Cohen et al. |

VEHICLE VISION SYSTEM WITH VEHICLE DETECTION

CROSS REFERENCE TO RELATED APPLICATIONS

The present application is a continuation of U.S. patent application Ser. No. 15/150,843, filed May 10, 2016, now U.S. Pat. No. 9,898,671, which claims the filing benefits of U.S. provisional application Ser. No. 62/159,515, filed May 11, 2015, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties. It is known to process captured image data to detect objects in the field of view of the vehicle camera or cameras. Typically, the structure of static objects is estimated via the use of moving cameras. However, in known formulations, as soon as the object starts to move, the estimation of the structure is typically erroneous and no longer valid.

SUMMARY OF THE INVENTION

The present invention provides a collision avoidance system or vision system or imaging system for a vehicle that utilizes one or more cameras (preferably one or more CMOS cameras) to capture image data representative of images exterior of the vehicle, and provides an estimation of an object motion relative to the vehicle and camera. The movement of the camera as the vehicle moves can be determined via vehicle movement (speed, altitude, direction, roll, pitch, yaw) information and the movement of the object is determined via the mathematical model and equations of the system of the present invention.

The present invention provides for simultaneous estimation of motion and structure of a moving object using a moving camera. The method and system of the present invention incorporates the estimation of the motion and structure of the unknown object into the same paradigm. This allows for better and more reliable estimation of the object structure as well as motion. The method and system of the present invention can be incorporated into object detection and/or three dimensional (3D) reconstruction algorithms that can benefit from the enhanced estimation of object structure and motion.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
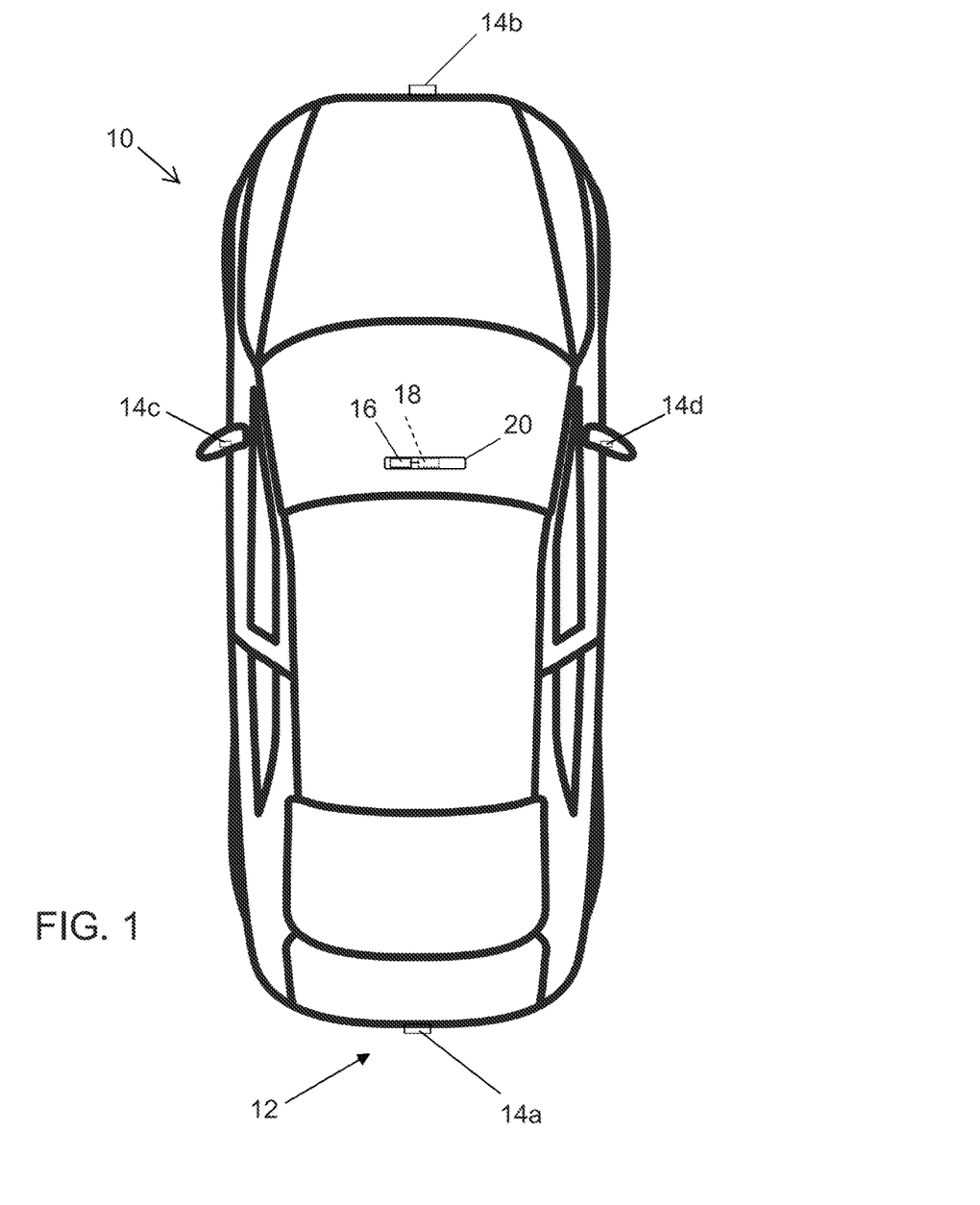
FIG. 1 is a plan view of a vehicle with a vision system that incorporates cameras in accordance with the present invention.
Figure 2:
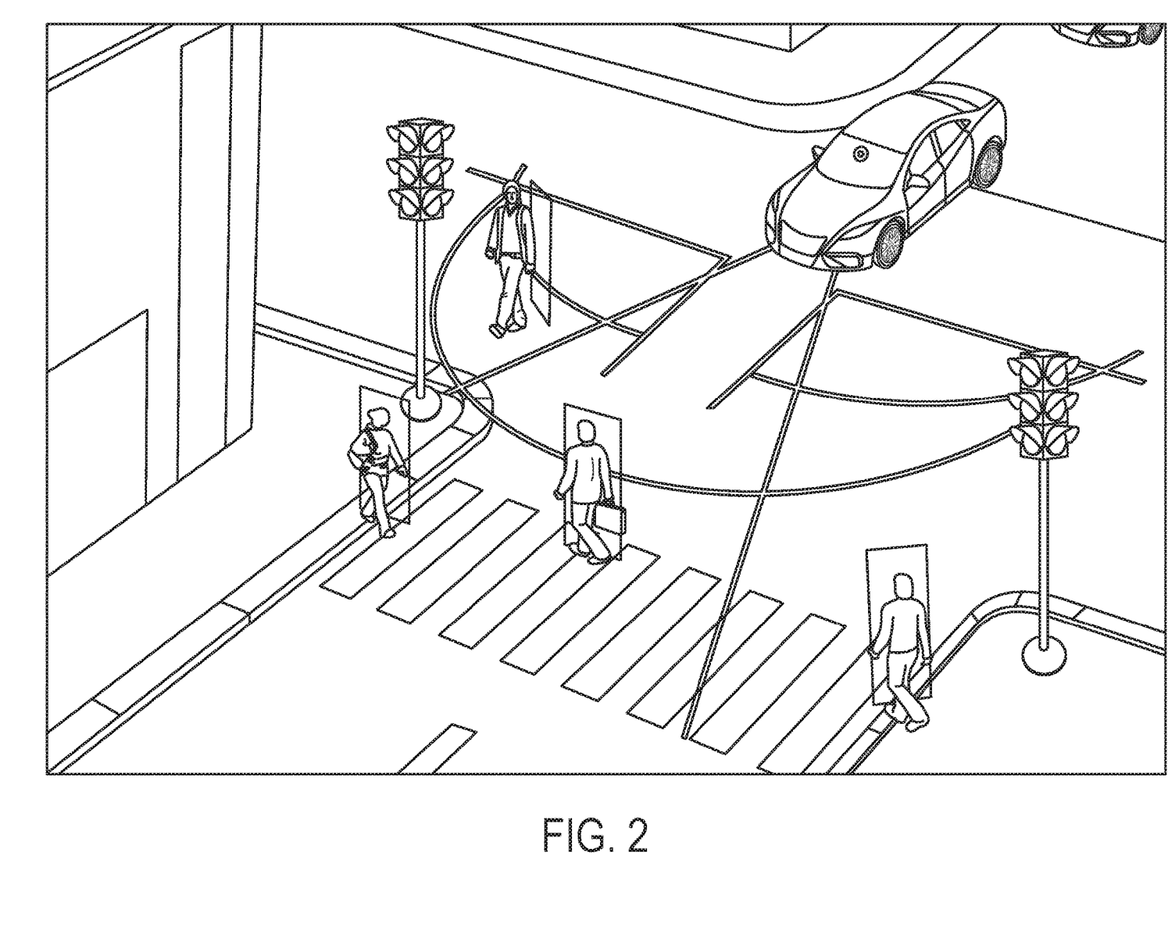
FIG. 2 is a perspective view of a vehicle and pedestrians forward of the vehicle and in the field of view of the forward facing camera or cameras of the vehicle.
Figure 3:
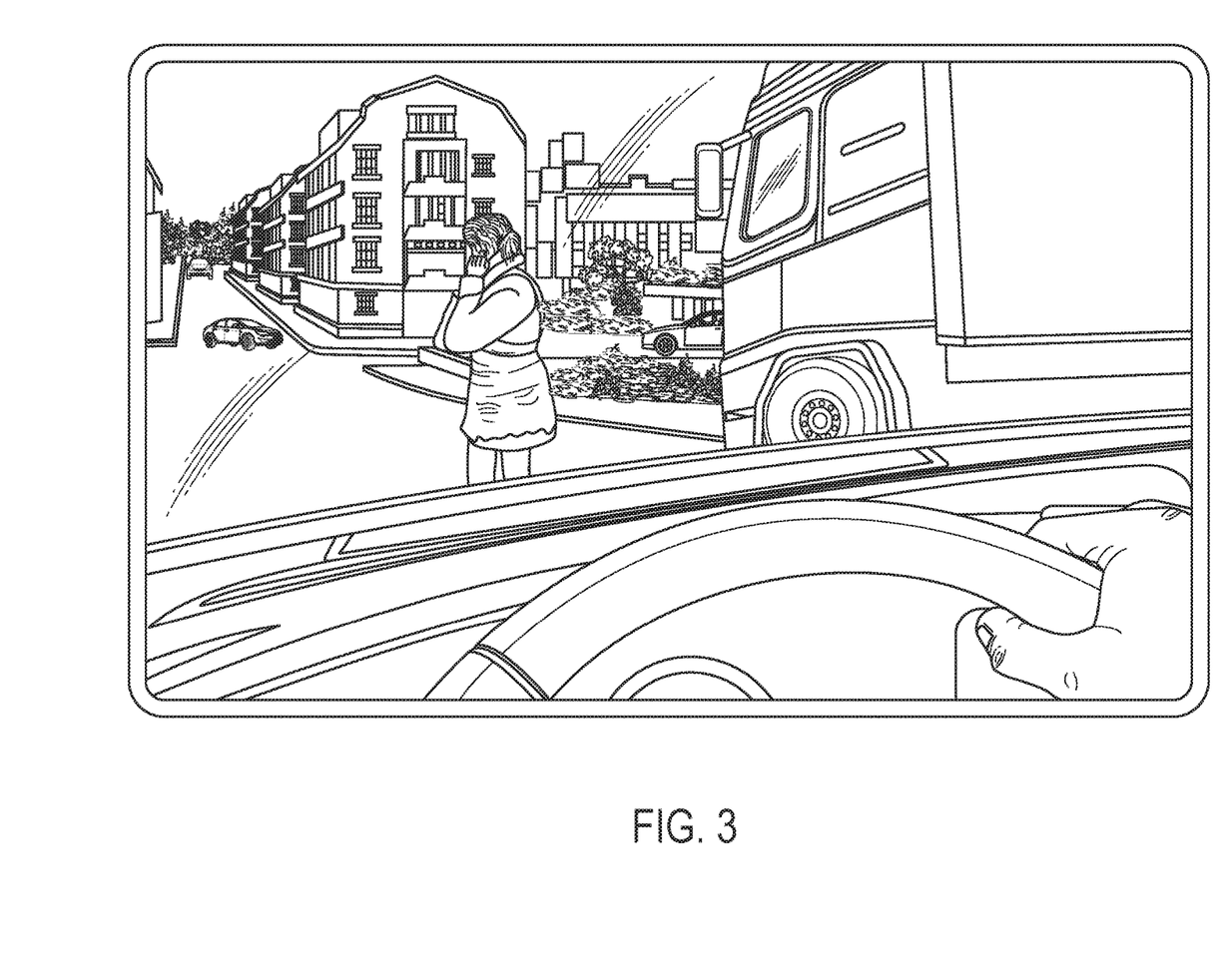
FIG. 3 is an image of a pedestrian in front of a vehicle as may be viewed by a driver of the vehicle.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Surround awareness and driver assistance is a marketable feature for vision systems. Generic object detection using a fish eye camera is one such feature. Distance estimation in the scene is desired to add value to existing detection based algorithms (such as, for example, object detection (OD), blind spot detection (BSD), automatic parking spot detection or the like), and to provide a stand-alone distance estimation feature.

Distance estimation is a triangulation-based structure from motion (SfM) problem, which requires the information on corresponding feature points in consecutive images and camera parameters at each viewpoint of the moving camera. A triangulation-based method can only provide a reasonable solution to the application scenarios such as a moving vehicle with a stationary background and a stationary vehicle with moving objects.

In reality, it is often required to estimate the distance of a moving object from a moving vehicle, which leads to a challenging issue on structure and motion estimation of a moving object using a moving camera (SaMfM). Such a structure and motion estimation of a moving object using a moving camera (SaMfM) violates the principle of traditional triangulation-based solution for distance estimation. Most past developments centered around the solutions by applying different constraints to trajectories and velocities of the moving objects and simultaneous estimation of moving object and moving camera.

The present invention provides a solution for structure and motion estimation of a moving object from a known moving camera. The moving camera extrinsic parameters are retrieved from vehicle CAN messages or signals (such as velocity and trajectory information or data). The system develops solutions with respect to two different constraints on trajectories of a rigid object, which are object translation at a constant speed in a certain time period, and object translation at an arbitrary speed in a certain time period.

The present invention establishes a two-view constraint for motion $\Delta X$ and structure $X$ of a moving object point:

$$x_{t-1}{}^T E \hat{x}_t = x_{t-1}{}^T E P_t \Delta X; \quad (1)$$

where correspondent feature points $x_{t-1} \leftrightarrow \hat{x}_t$; camera projection matrix (3×4 matrix) at t: $P_t$; camera motion: R, T→3×3 essential matrix: $E=[T]_x R$ The method or system of the present invention may, in step 1, detect object features in a captured image view, and in step 2 perform feature correspondence analysis between two views or feature tracking in consecutive views, and in step 3, given a certain number of correspondent feature pairs, solve equation (1) to provide an estimate of object motion $\Delta X$. For this, an SVD method can be used. Step 4 then calculates the structure of an object point $X$ by using image projection equations along with the estimated $\Delta X$.

In the case of a 3D translation $$\Delta X = \begin{bmatrix} \Delta X \\ \Delta Y \\ \Delta Z \\ \alpha \end{bmatrix},$$

for an object of an arbitrary translation (arbitrary speed in a particular time period), a minimum of three non-co-linear corresponding point pairs from two views are required to find a solution of $\Delta X$ using equation (1) above. For an object of constant translation (constant speed in a particular time period), only one feature object point, which is tracked in a minimum of four views, may be required to find a solution of $\Delta X$ using equation (1).

In the case of a two dimensional (2D) translation $$\Delta X = \begin{bmatrix} \Delta X \\ \Delta Y \\ 0 \\ \alpha \end{bmatrix},$$

for an object of an arbitrary translation (arbitrary speed in a particular time period), a minimum two non-co-linear corresponding point pairs from two views are required to find a solution of $\Delta X$ using equation (1) above. For an object of constant translation (constant speed in a particular time period), only one feature object point, which is tracked in a minimum of three views, may be required to find a solution of $\Delta X$ using equation (1).

The algorithm and system and method of the present invention is operable to estimate the displacement of a rigid object in the real world from two or multiple views, given that camera information at each viewpoint and image corresponding points are available. In the case of a moving object having an arbitrary translation, a minimum of three corresponding object point pairs from two views are needed for estimation of 3D object translation, while a minimum of two corresponding point pairs are required for 2D object displacement. In case of a moving object having a constant translation, one feature point, tracked in a minimum of four views, is needed for estimation of 3D object translation, while one feature point, tracked in a minimum of three views, is required for 2D object displacement.

Figure 4:
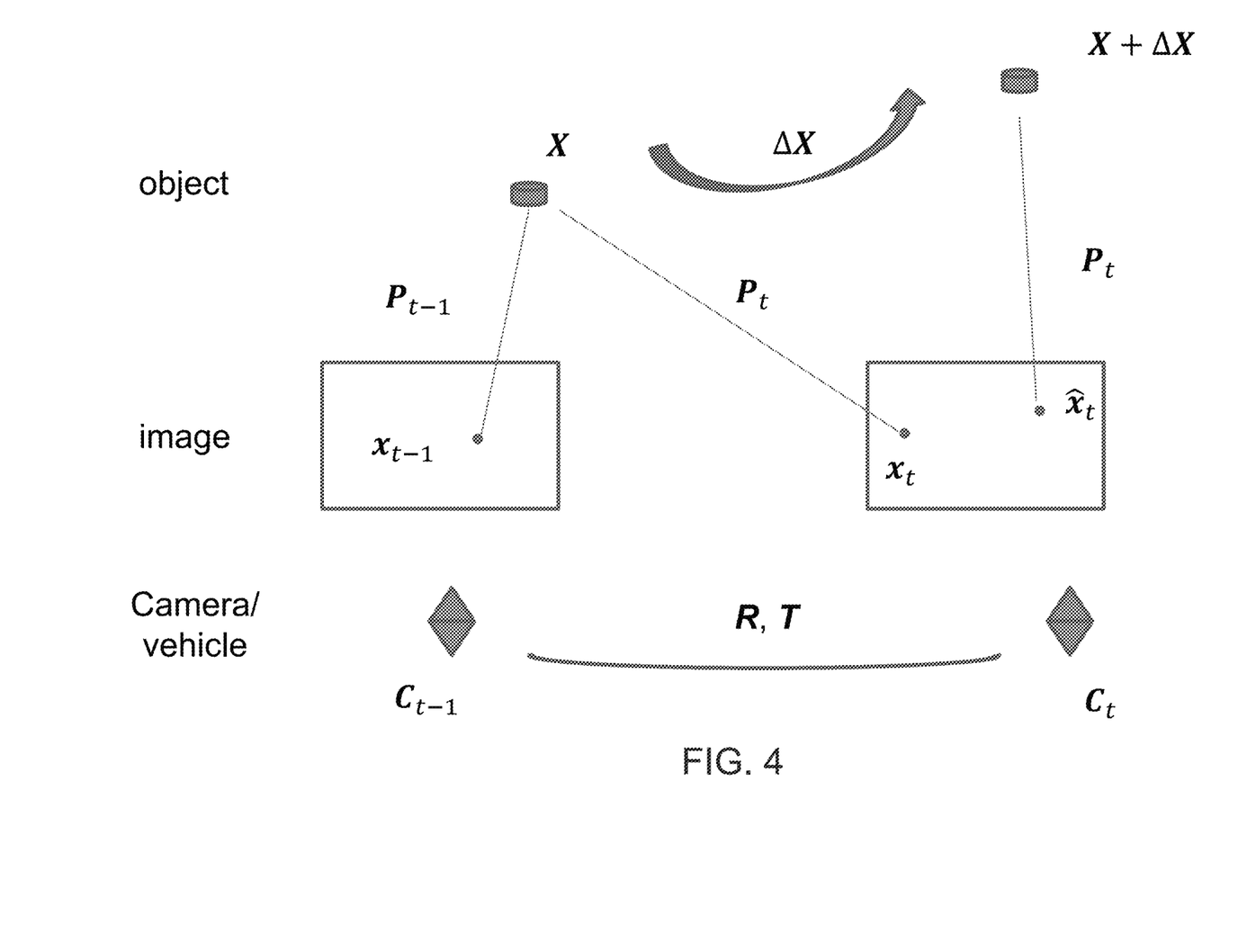
FIG. 4 is a schematic of a moving camera and a moving object, showing where the moving object is imaged by the moving camera.

As shown in FIG. 4, from time instant t−1 to t, the object is moving from position X to X+$\Delta X$, while the camera/vehicle movement is R, T. The camera projection matrix is $P_{t-1}$ and $P_t$. The image features $x_{t-1}$ and $x_t$ are the projection of a moving object at position X onto the camera at time instant t−1 and t, and $\hat{x}_t$ is the projection of a moving object at position X+$\Delta X$ onto camera at time instant t.

From epipolar geometry (a 3×3 matrix):

$$x_{t-1}{}^T E x_t = 0 \quad (2)$$

From projection geometry (a 3×4 matrix):

$$x_{t-1} = P_{t-1} X \quad (3)$$

$$x_t = P_t X \quad (4)$$

$$\hat{x}_t = P_t(X+\Delta X) \quad (5)$$

Note that x and X are the homogeneous representations of the 2D and 3D positions of the object.

The known information or parameters include (from vehicle CAN information) the camera projection matrix (3×4 matrix) $P_{t-1}$, $P_t$, and camera motion (R, T→3×3 essential matrix: $E=[T]_x R$. From feature corresponding analysis, the corresponding point pair $(x_{t-1} \leftrightarrow \hat{x}_t)$ is also known.

The unknown parameters to be estimated (reconstruction up to a scale) include the object position X and the object translation $\Delta X$.

The solution involves the following steps, with Step 1 (from equations (4) and (5) above) solving the equations:

$$\hat{x}_t = P_t(X+\Delta X) = x_t + P_t \Delta X \quad (6)$$

which results in:

$$x_t = \hat{x}_t - P_t \Delta X \quad (7)$$

Step 2 replaces $x_t$ of equation (2) in equation (7):

$$x_{t-1}^T E x_t = x_{t-1}^T E(\hat{x}_t - P_t \Delta X) = 0 \qquad (8)$$

which results in:

$$x_{t-1}^T E \hat{x}_t = x_{t-1}^T E P_t \Delta X \qquad (9)$$

Equation (9) thus provides one two-view constraint for a moving object point.

Now, In the case of the 3D translation $$\Delta X = \begin{bmatrix} \Delta X \\ \Delta Y \\ \Delta Z \\ \alpha \end{bmatrix},$$

for an object of an arbitrary translation (arbitrary speed in a particular time period), a minimum of three non-colinear corresponding point pairs from two views are required to find a solution of ΔX using equation (9) above. For an object of constant translation (constant speed in a particular time period), only one feature object point, which is tracked in a minimum of four views, may be required to find a solution of ΔX using equation (9).

In the case of a 2D translation $$\Delta X = \begin{bmatrix} \Delta X \\ \Delta Y \\ 0 \\ \alpha \end{bmatrix},$$

for an object of an arbitrary translation (arbitrary speed in a particular time period), a minimum two non-colinear corresponding point pairs from two views are required to find a solution of ΔX using equation (9) above. For an object of constant translation (constant speed in a particular time period), only one feature object point, which is tracked in a minimum of three views, may be required to find a solution of ΔX using equation (9).

Thus, the coordinates (structure) X of a moving object point are calculated by using equations (3) and (4) along with the estimated ΔX.

The method and system of the present invention thus may determine the motion or path of the vehicle responsive to vehicle system inputs, such as inputs from or indicative of the vehicle steering wheel angle and/or vehicle speed and/or the like, and determines the motion and relative motion of an object in the field of view of the camera. The system may utilize aspects of the systems described in U.S. Patent Publication Nos. US-2014-0347486; US-2014-0350834; US-2015-0002670; US-2015-0291215; US-2015-0178576 and/or US-2015-0175072, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661; WO 2013/158592 and/or WO 2014/204794, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Publication No. US-2012-0062743, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. Publication No. US-2012-0162427, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method for detecting a vehicle via a vehicular vision system, said method comprising:
   equipping a vehicle with a camera so that the camera has a field of view exterior of the equipped vehicle;
   providing a control at the equipped vehicle, the control comprising an image processor;
   capturing frames of image data with the camera;
   processing, via the image processor, frames of image data captured by the camera;
   while the equipped vehicle is moving, and responsive at least in part to (i) vehicle motion information of the equipped vehicle and (ii) processing, via the image processor, of frames of image data captured by the camera, detecting a vehicle present in the field of view of the camera and determining motion of the detected vehicle relative to the moving equipped vehicle; and
   wherein determining motion of the detected vehicle relative to the moving equipped vehicle comprises (i) determining corresponding feature points of the detected vehicle in at least two frames of image data captured by the camera and (ii) estimating vehicle motion trajectory of the detected vehicle based on the determined corresponding feature points.

2. The method of claim 1, wherein vehicle motion information includes at least speed of the equipped vehicle.

3. The method of claim 2, wherein vehicle motion information includes trajectory of the equipped vehicle.

4. The method of claim 3, wherein determining motion of the detected vehicle relative to the moving equipped vehicle comprises determining structure of the detected vehicle based on the estimated vehicle motion trajectory of the detected vehicle.

5. The method of claim 1, comprising providing vehicle motion information to the control via a CAN bus of the equipped vehicle.

6. The method of claim 1, wherein determining motion of the detected vehicle relative to the moving equipped vehicle is responsive at least in part to (i) vehicle motion information and (ii) image processing, via the image processor, of at least four frames of image data captured by the camera.

7. The method of claim 1, wherein determining motion of the detected vehicle relative to the moving equipped vehicle is responsive at least in part to utilization of at least two constraints on trajectory.

8. The method of claim 7, wherein the at least two constraints comprise at least one of (i) object translation at a constant speed over a certain time period and (ii) object translation at an arbitrary speed over a certain time period.

9. The method of claim 1, wherein moving feature points are determined via the following equation:

$$x_{t-1}{}^T E \hat{x}_t = x_{t-1}{}^T E P_t \Delta X;$$

where $x_{t-1}$ and $x_t$ are projections at position X at time instants t−1 and t, $\hat{x}_t$ is projection at position X+ΔX at time instant t, and $P_t$ is a projection matrix of the camera.

10. The method of claim 9, comprising performing a feature correspondence analysis between two frames of captured image data and, given a number of correspondent feature pairs, solving the equation to provide an estimate of object motion ΔX.

11. The method of claim 10, comprising calculating structure of an object point X by using image projection equations along with the estimated object motion ΔX.

12. The method of claim 1, wherein the camera is part of a multi-camera surround view vision system of the equipped vehicle, and wherein said method comprises providing a display at the equipped vehicle for viewing by a driver of the equipped vehicle, and displaying, via the display, images derived from image data captured by the camera and at least some of the other cameras of the multi-camera surround view vision system to assist the driver in maneuvering the equipped vehicle.

13. A method for detecting a vehicle via a vehicular vision system, said method comprising:

equipping a vehicle with a camera so that the camera has a field of view exterior of the equipped vehicle;

providing a control at the equipped vehicle, the control comprising an image processor;

capturing frames of image data with the camera;

processing, via the image processor, frames of image data captured by the camera;

while the equipped vehicle is moving, and responsive at least in part to (i) vehicle motion information of the equipped vehicle and (ii) processing, via the image processor, of frames of image data captured by the camera, detecting a vehicle present in the field of view of the camera and determining motion of the detected vehicle relative to the moving equipped vehicle;

wherein vehicle motion information includes at least speed of the equipped vehicle and trajectory of the equipped vehicle;

wherein determining motion of the detected vehicle relative to the moving equipped vehicle comprises (i) determining corresponding feature points of the detected vehicle in at least two frames of image data captured by the camera and (ii) estimating vehicle motion trajectory of the detected vehicle based on the determined corresponding feature points; and wherein the camera is part of a multi-camera surround view vision system of the equipped vehicle.

14. The method of claim 13, comprising providing vehicle motion information to the control via a communication bus of the equipped vehicle.

15. The method of claim 14, wherein the communication bus comprises a CAN bus of the equipped vehicle, and wherein said method comprises providing a display at the equipped vehicle for viewing by a driver of the equipped vehicle, and displaying, via the display, images derived from image data captured by the camera and at least some of the other cameras of the multi-camera surround view vision system to assist the driver in maneuvering the equipped vehicle.

16. The method of claim 14, wherein determining motion of the detected vehicle relative to the moving equipped vehicle comprises determining structure of the detected vehicle based on the estimated vehicle motion trajectory of the detected vehicle.

17. The method of claim 13, wherein determining motion of the detected vehicle relative to the moving equipped vehicle is responsive at least in part to utilization of at least two constraints on trajectory.

18. The method of claim 17, wherein the at least two constraints comprise (i) object translation at a constant speed over a certain time period and (ii) object translation at an arbitrary speed over a certain time period.

19. A method for detecting a vehicle via a vehicular vision system, said method comprising:

equipping a vehicle with a camera so that the camera has a field of view exterior of the equipped vehicle;

providing a control at the equipped vehicle, the control comprising an image processor;

capturing frames of image data with the camera;

processing, via the image processor, frames of image data captured by the camera;

while the equipped vehicle is moving, and responsive at least in part to (i) vehicle motion information of the equipped vehicle and (ii) processing, via the image processor, of at least four frames of image data captured by the camera, detecting a vehicle present in the field of view of the camera and determining motion of the detected vehicle relative to the moving equipped vehicle;

wherein vehicle motion information includes at least speed of the equipped vehicle; and wherein determining motion of the detected vehicle relative to the moving equipped vehicle comprises (i) determining corresponding feature points of the detected vehicle in at least two frames of image data captured by the camera and (ii) estimating vehicle motion trajectory of the detected vehicle based on the determined corresponding feature points.

20. The method of claim 19, comprising providing vehicle motion information to the control via a CAN bus of the equipped vehicle.

21. The method of claim 20, wherein vehicle motion information includes trajectory of the equipped vehicle.

22. The method of claim 20, wherein determining motion of the detected vehicle relative to the moving equipped vehicle comprises determining structure of the detected vehicle based on the estimated vehicle motion trajectory of the detected vehicle.

23. The method of claim 19, wherein the camera is part of a multi-camera surround view vision system of the equipped vehicle, and wherein said method comprises providing a display at the equipped vehicle for viewing by a driver of the equipped vehicle, and displaying, via the display, images derived from image data captured by the camera and at least some of the other cameras of the multi-camera surround view vision system to assist the driver in maneuvering the equipped vehicle.

24. The method of claim 19, wherein determining motion of the detected vehicle relative to the moving equipped vehicle is responsive at least in part to utilization of at least two constraints on trajectory.

25. The method of claim 24, wherein the at least two constraints comprise (i) object translation at a constant speed over a certain time period and (ii) object translation at an arbitrary speed over a certain time period.

* * * * *